(12) United States Patent
Yeh et al.

(10) Patent No.: US 8,611,441 B2
(45) Date of Patent: Dec. 17, 2013

(54) METHOD FOR TRANSMISSION INTERFERENCE CANCELLATION FOR MU-MIMO

(75) Inventors: Choong Il Yeh, Daejeon (KR); Seung Joon Lee, Daejeon (KR); Dong Seung Kwon, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 805 days.

(21) Appl. No.: 12/735,071

(22) PCT Filed: Aug. 22, 2008

(86) PCT No.: PCT/KR2008/004910
§ 371 (c)(1),
(2), (4) Date: Jun. 11, 2010

(87) PCT Pub. No.: WO2009/075456
PCT Pub. Date: Jun. 18, 2009

(65) Prior Publication Data
US 2010/0255797 A1 Oct. 7, 2010

(30) Foreign Application Priority Data
Dec. 13, 2007 (KR) .................. 10-2007-0130389

(51) Int. Cl.
*H04B 15/00* (2006.01)
*H04L 25/03* (2006.01)
*H04L 27/00* (2006.01)

(52) U.S. Cl.
USPC ..................... 375/260; 375/285; 375/296

(58) Field of Classification Search
USPC .................. 375/260, 267, 285, 296
See application file for complete search history.

(56) References Cited

U.S. PATENT DOCUMENTS

| | | | |
|---|---|---|---|
| 7,580,445 B2 * | 8/2009 | Wang et al. | 375/146 |
| 2007/0086549 A1 | 4/2007 | Kim et al. | |
| 2011/0019777 A1 * | 1/2011 | Qu | 375/340 |

FOREIGN PATENT DOCUMENTS

| | | |
|---|---|---|
| KR | 10-2007-0019345 | 2/2007 |
| KR | 10-2007-0039285 | 4/2007 |
| WO | WO 2005/069572 A1 | 7/2005 |
| WO | WO 2006/029546 A2 | 3/2006 |
| WO | WO 2006/036052 A2 | 4/2006 |
| WO | WO 2006/101716 A2 | 9/2006 |
| WO | WO 2006/101812 A2 | 9/2006 |
| WO | WO 2006/120511 A1 | 11/2006 |
| WO | WO 2007/044484 A2 | 4/2007 |

OTHER PUBLICATIONS

International Search Report and Written Opinion of International Searching Authority dated Dec. 18, 2008 in relation to International Application No. PCT/KR2008/004910.

(Continued)

*Primary Examiner* — David B. Lugo

(57) ABSTRACT

The present invention relates to a transmission interference cancellation method for a multiuser MIMO system. The method includes decomposing a channel matrix to represent formulae of permutation matrixes including a first matrix and a second matrix; determining an optimal permutation matrix among a plurality of available permutation matrixes using a norm of multiplication of the second matrix and a transmitting data vector; and determining the second matrix using the determined optimal permutation matrix and calculating a transmitting precoding vector using the determined second matrix and the transmitting data vector.

20 Claims, 3 Drawing Sheets

(56) References Cited

OTHER PUBLICATIONS

Sang-Rim Lee, et al.: "Optimal Detection Ordering for V-BLAST", School of Electrical Eng., Korea University, Seoul, Korea, 2007 IEEE, 6 pages.

Christoph Windpassinger, et al.: "Precoding and Loading for BLAST-like Systems", Lehrstul für Informationsübertragung, Universität Erlangen-Nürnberg, Cauerstraβe 7/NT, 91058 Erlangen Germany, pp. 3061-3065.

* cited by examiner

METHOD FOR TRANSMISSION INTERFERENCE CANCELLATION FOR MU-MIMO

CROSS-REFERENCE TO RELATED APPLICATION(S)

The present application is related to International Application No. PCT/KR2008/004910 filed Aug. 22, 2008 entitled "METHOD FOR TRANSMISSION INTERFERENCE CANCELLATION FOR MU-MIMO" which claims priority to Korean Patent Application No. 10-2007-0130389 filed Dec. 13, 2007. International Application No. PCT/KR2008/004910 is assigned to the assignee of the present application and is hereby incorporated by reference into the present disclosure as if fully set forth herein. The present application hereby claims priority under 35 U.S.C. §119(a) to International Patent Application No. PCT/KR2008/004910 and Korean Patent Application No. 10-2007-0130389.

TECHNICAL FIELD

The present invention relates to a transmission interference cancellation method for a mobile communication system, and particularly, to a transmission interference cancellation method for a multi-user MIMO system.

BACKGROUND ART

Multi-user MIMO (multi-user multi-input multi-output, hereinafter referred to as "MU-MIMO") refers to a technology in which a transmitter simultaneously transmits different data to a plurality of terminals using the same spectrum in an environment where the transmitter having multiple antennas communicates with a plurality of receivers each having at least one antenna.

In order to materialize the MU-MIMO technology, the transmitter must include multiple transmitting antennas. The transmitter including multiple antennas needs to recognize a channel status information transmitter (CSIT) between an individual transmitting antenna and an individual receiving antenna to transmit different data to a plurality of receivers by using the same spectrum.

The transmitter recognizes the CSIT through CSIT feedback of the receiver, or acquires the CSIT by using a sounding channel transmitted from the receiver.

The MU-MIMO technology is classified into open loop MU-MIMO (OL MU-MIMO) that does not need the CSIT and closed loop MU-MIMO (CL MU-MIMO) that needs the CSIT. Further, the CL MU-MIMO is classified into partial CSIT MU-MIMO and full CSIT MU-MIMO according to the degree of CSIT. The full CSIT MU-MIMO is classified into a linear type and a non-linear type.

The performance of the CL MU-MIMO is better than that of the OL MU-MIMO. Further, as for the CL MU-MIMO, the performance of the full CSIT MU-MIMO is better than that of the partial CSIT MU-MIMO. However, the full CSIT MU-MIMO requires much more feedback than the partial CSIT MU-MIMO for the receiver to transmit the CSIT to the transmitter.

The full CSIT MU-MIMO is classified into the linear type and the non-linear type. In this case, the non-linear type provides much better performance than the linear type, but requires significant complexity for materialization.

An exemplary algorithm of the linear MU-MIMO includes channel inversion (hereinafter referred to as CI) and regularized channel inversion (hereinafter referred to as RI), and an exemplary algorithm of the non-linear MU-MIMO includes dirty paper coding (DPC), sphere encoding, and transmission vertical Bell Lab layered space time (VBLAST). The transmission VBLAST includes a transmitter to which the VBLAST is applied. Therefore, since interference cancellation is applied to the transmitter, the transmission VBLAST is considered to be an actually applied type of DPC.

FIG. 1 is a diagram showing SER performances of CI, RI, sphere encoding, and transmission VBLAST MU-MIMO algorithms. FIG. 1 shows a case in which different data is transmitted using the same spectrum by applying CI, RI, sphere encoding, and transmission VBLAST MU-MIMO algorithms, and 16QAM is used as the modulation method. Referring to FIG. 1, it is understood that the performance of the non-linear MU-MIMO is better than that of the linear MU-MIMO, and the sphere encoder has much better performance than the transmission VBLAST. However, the complexity of the sphere encoder is too high to be materialized.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a transmission interference cancellation method having advantages of low complexity and excellent performance.

Technical Solution

An exemplary embodiment according to the invention provides a transmitter interference cancellation method. The method includes decomposing a channel matrix to represent formulae of permutation matrixes including a first matrix and a second matrix; determining an optimal permutation matrix among a plurality of available permutation matrixes by using a norm of multiplication of the second matrix and a transmitting data vector; and determining the second matrix by using the determined optimal permutation matrix and calculating a transmitting precoding vector using the determined second matrix and the transmitting data vector.

Another exemplary embodiment according to the invention provides a method of determining an optimal permutation matrix of a transmitter. The method includes setting an index of a permutation matrix to 1; calculating a norm of multiplication of a second matrix determined according to a permutation matrix having an index of 1 and a transmitting a data vector; confirming whether the index of the permutation matrix is equal to the number of available permutation matrixes; increasing the index of the permutation matrix by 1 when the index of the permutation matrix is not equal to the number of available permutation matrixes according to the confirmation result; and calculating a norm of the multiplication of the second matrix that is determined by the permutation matrix corresponding to the index of the permutation matrix that is increased by 1 and the transmitting data vector.

Still another exemplary embodiment according to the invention provides a method of determining an optimal permutation matrix of a transmitter. The method includes selecting a plurality of second permutation matrixes from a plurality of first permutation matrixes; setting an index of the permutation matrixes to 1; calculating a norm of multiplication of a transmitting data vector and a second matrix that is determined by a permutation matrix whose index is 1 among the plurality of second permutation matrixes; confirming whether the index of the permutation matrix is equal to the number of the plurality of second permutation matrixes; increasing the index of the permutation matrix by 1 when the index of the permutation matrix is not equal to the number of the plurality of second permutation matrixes according to the confirmation result; and calculating a norm of the multiplication of the second matrix that is determined by the permutation matrix corresponding to the index of the permutation matrix that is increased by 1 and the transmitting data vector.

Advantageous Effects

As described above, according to the exemplary embodiments of the present invention, it is possible to suggest a transmitter interference cancellation method with low complexity and excellent performance by determining a permutation matrix that minimizes the transmission power.

MODE FOR THE INVENTION

Figure 1:
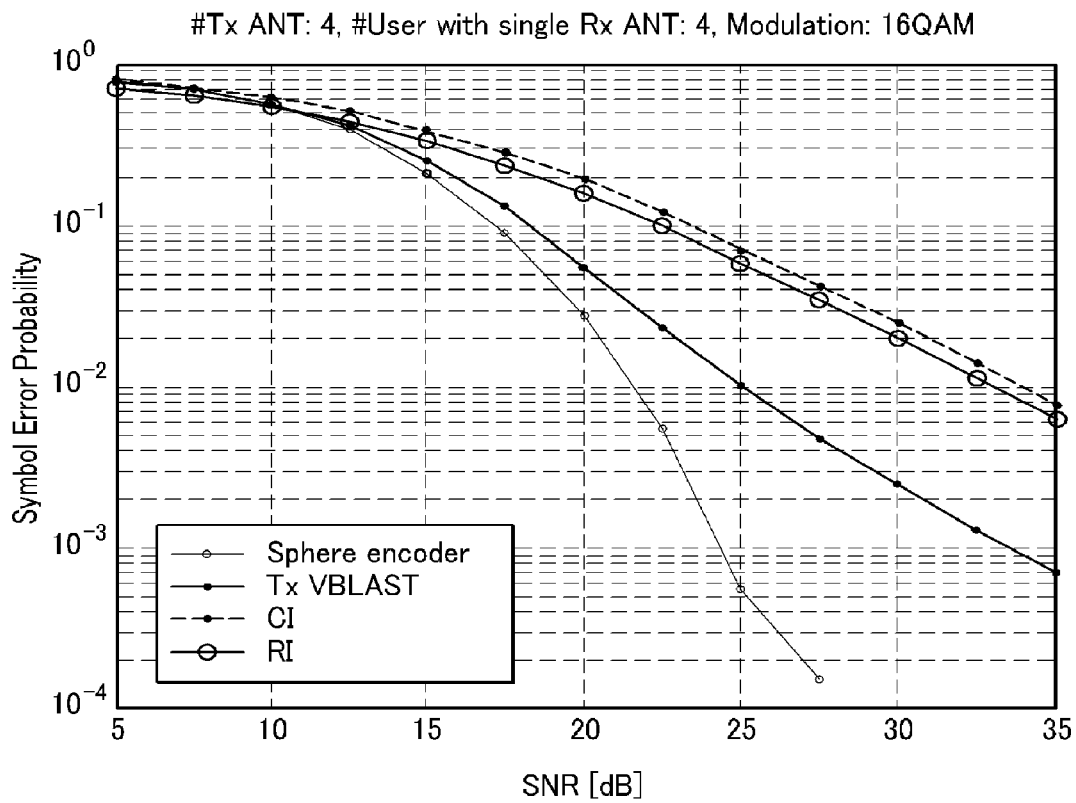
FIG. 1 is a diagram showing SER performances of CI, RI, sphere encoding, and transmission VBLAST MU-MIMO algorithms.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "unit" or "-er" used herein means one unit that processes a specific function or operation, and may be implemented by hardware or software, or a combination thereof.

First, an interference cancellation method according to a first exemplary embodiment of the present invention will be described.

It is assumed that MU-MIMO is embodied between a transmitter including M transmitting antennas and K receivers each including a single receiving antenna by using transmission VBLAST. In this case, the transmitter recognizes K (M channel matrix (H)) and transmits different data streams to individual terminals by using the same spectrum. In the exemplary embodiment of the present invention, K=M is assumed for simple calculation.

H can be resolved to $PBW^{-1}$. P' is a transpose of P. Here, P is a permutation matrix that rearranges the orders of MU-MIMO users and has 1's or 0's as elements. In the first exemplary embodiment of the present invention, P is determined so as to maximize the SNR. Transmission data vector is calculated as represented by Equation 1 using a data vector u to be transmitted.

$$u = \begin{bmatrix} u_1 \\ u_2 \\ \vdots \\ u_K \end{bmatrix},$$ (Equation 1)

$$\tilde{s} = \begin{bmatrix} \tilde{s}_1 \\ \tilde{s}_2 \\ \vdots \\ \tilde{s}_K \end{bmatrix},$$

$$\tilde{s}_K = u_K$$

$$\tilde{s}_{K-1} = f_\tau(u_{K-1} - \eta b_{K-1,K} \tilde{s}_K)$$

$$\cdots$$

$$\tilde{s}_1 = f_\tau\left(u_1 - \eta \sum_{l=2}^{K} b_{1,l} \tilde{s}_l\right)$$

Here, $b_{k,l}$ is an (k,l) element of matrix B, and $\eta$ is SNR/(1+SNR). SNR is a signal-to-noise ratio.

The function $f_\tau$ refers to Tomlinson Harashima (TH) precoding and is represented by Equation 2.

$$f_\tau(y) = y - \left\lfloor \frac{y + \tau/2}{\tau} \right\rfloor \tau$$ (Equation 2)

When considering the power condition, a signal s that is formed in the transmitter for MU-MIMO is as represented by Equation 3.

$$s = W\tilde{s}/\|W\tilde{s}\| = W\tilde{s}/\sqrt{\gamma}$$ (Equation 3)

Therefore, vectors that are received by K receivers are represented by Equation 4.

$$y = \frac{1}{\sqrt{\gamma}} Hs + w$$ (Equation 4)

Here, w refers to a vector that represents a thermal noise generated in each of the receivers.

By applying a TH processor of $f_{\tau/\sqrt{\gamma}}(\eta y_k)$ to the receivers, $y_k'$ and $u_k$ can be calculated as represented by Equation 5.

$$y_k' = \frac{\eta}{\sqrt{\gamma}} u_k + w_k' \qquad \text{(Equation 5)}$$

Here, $\tau$ is a constant that is determined according to the modulation method.

Figure 2:
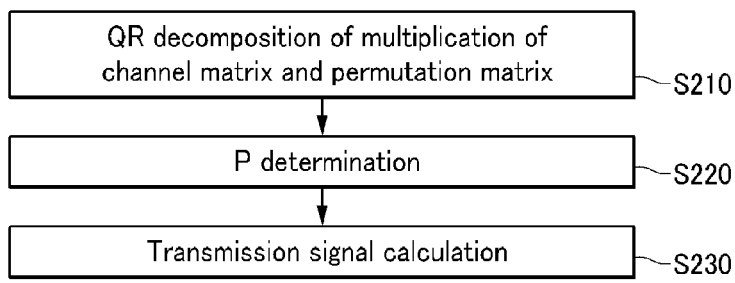
FIG. 2 is a flowchart showing an interference cancellation method according to an exemplary embodiment of the present invention.

Next, an interference cancellation method according to a second exemplary embodiment of the present invention will be described with reference to FIG. 2 to FIG. 4. FIG. 2 is a flowchart showing an interference cancellation method according to an exemplary embodiment of the present invention.

The transmitter multiplies a channel matrix (H) by a permutation matrix (P) and then performs QR decomposition (S210).

In order to embody MU-MIMO between a transmitter including M transmitting antennas and K receivers including a single receiving antenna, the transmitter needs to recognize K (M channel matrix (H)). A permutation matrix (P) is a matrix that rearranges the orders of MU-MIMO users, and has 1's or 0's as elements. The QR decomposition of the multiplication of the channel matrix (H), and the permutation matrix (P) is represented by Equation 6.

$$PH = RQ \qquad \text{(Equation 6)}$$

The channel matrix H is represented by Equation 7.

$$H = P'BW^{-1},$$

$$B = RG^{-1} = \begin{bmatrix} 1 & b_{1,2} & \cdots & b_{1,K} \\ 0 & 1 & \cdots & b_{2,K} \\ \vdots & \vdots & \ddots & \vdots \\ 0 & 0 & \cdots & 1 \end{bmatrix}, \qquad \text{(Equation 7)}$$

$$W = Q^{-1}G^{-1},$$

$$G = \mathrm{diag}(\mathrm{diag}(R))$$

The transmitter determines the permutation matrix P (S220).

The performance of MU-MIMO is largely influenced by the permutation matrix P that rearranges the orders of users. When the number of available permutation matrixes is N, the index set of the permutation matrixes is $\{1, 2, \ldots, N\}$, and the set of the permutation matrix is $\{P_1, P_2, \ldots, P_N\}$.

The exemplary embodiment of the present invention suggests two methods of determining an optimal permutation matrix.

Figure 3:
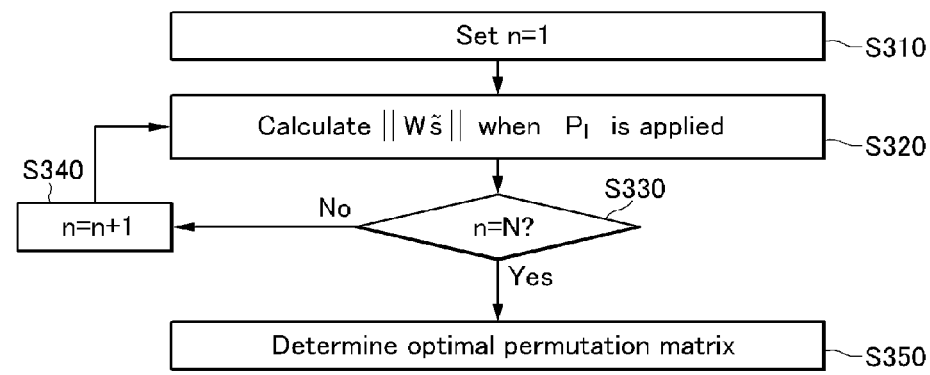
FIG. 3 is a flowchart showing a first method that determines an optimal permutation matrix in the interference cancellation method according to the exemplary embodiment of the present invention.

First, the first method is described referring to FIG. 3. FIG. 3 is a flowchart showing a first method that determines an optimal permutation matrix in the interference cancellation method according to the exemplary embodiment of the present invention.

The transmitter sets the permutation matrix index n to 1 (S310) and calculates $\|W\tilde{s}\|$ when $P_1$ is applied (S320). $\tilde{s}$ refers to a transmission data vector. After checking whether n is N (S330), if n is not N, n is set to n+1 (S340). Thereafter, $\|W\tilde{s}\|$ is calculated when $P_n$ is applied (S320). If n is N, $P_n$ that has a minimum $\|W\tilde{s}\|$ is determined as the optimal permutation matrix by using Equation 8 (S350).

$$n = \arg\min_{\{1,2,\ldots,N\}} \|W\tilde{s}\| \qquad \text{(Equation 8)}$$

According to the first method, when M and K are small, since the complexity is not high, MU-MIMO can be materialized, whereas when M and K are large, it is difficult to materialize the MU-MIMO due to the increased complexity.

For example, the number of available permutation matrixes is 24 when M and K are 4. Therefore, the complexity is 24 times larger than that of the existing transmission VBLAST. As a result, it is possible to obtain improved performance with smaller complexity than that of the sphere encoder. However, the number of available permutation matrixes is 10 in the case of M=K=10. In this case, since the complexity is increased, it is difficult to materialize MU-MIMO.

Next, a second method will be described with reference to FIG. 4. FIG. 4 is a flowchart showing a second method that determines an optimal permutation matrix in the interference cancellation method according to the exemplary embodiment of the present invention.

According to the second method, some of the total permutation matrixes are arbitrarily selected, and the transmitter determines a permutation matrix that has a minimum $\|W\tilde{s}\|$ as the optimal permutation matrix among the selected permutation matrixes.

Figure 4:
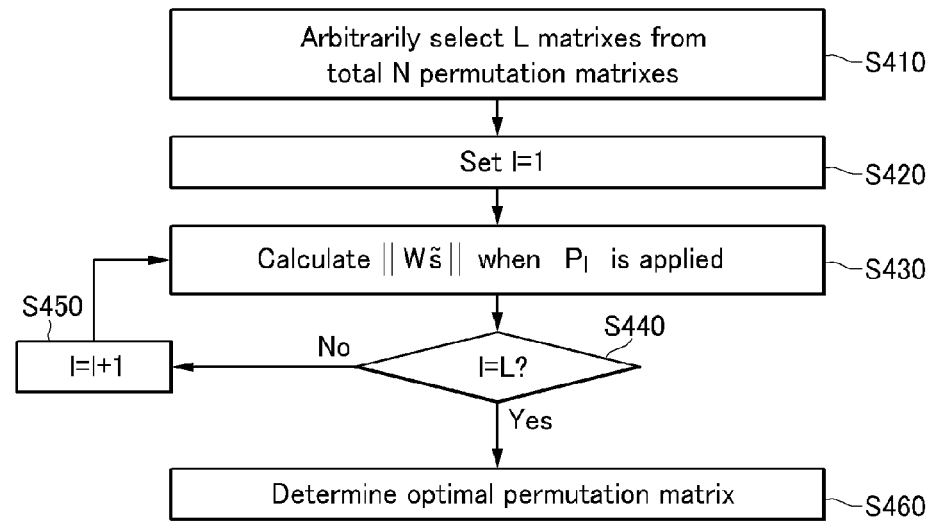
FIG. 4 is a flowchart showing a second method that determines an optimal permutation matrix in the interference cancellation method according to the exemplary embodiment of the present invention.

As shown in FIG. 4, the transmitter arbitrarily selects L permutation matrixes among the total N permutation matrixes (S410). The index set of the selected permutation matrixes is $\{1, 2, \ldots, L\}$, and the set of the selected permutation matrixes is $\{P_1, P_2, \ldots, P_L\}$.

The transmitter sets the permutation matrix index l to 1 (S420), and calculates $\|W\tilde{s}\|$ when $P_1$ is applied (S430). Then, the transmitter checks whether l is L (S440), and if l is not L, the transmitter sets l to l+1 (S450) to calculate $\|W\tilde{s}\|$ when $P_l$ is applied (S430). If l is L, the transmitter determines $P_l$ that has a minimum $\|W\tilde{s}\|$ as the optimal permutation matrix by using Equation 9 (S460).

$$l = \arg\min_{\{1,2,\ldots,L\}} \|W\tilde{s}\| \qquad \text{(Equation 9)}$$

According to the exemplary embodiment of the present invention, the first method is referred to as a full search method, which determines a permutation matrix having minimum transmitting power as an optimal permutation from the total available permutation matrixes, and the second method is referred to as a limited random search method, which determines an optimal permutation matrix from the arbitrarily selected permutation matrix that is arbitrarily selected by taking the complexity of materialization into consideration.

The transmitter generates a transmission signal s in which the power condition is considered, by using Equation 10.

$$s = W\tilde{s}/\|W\tilde{s}\| = W\tilde{s}/\sqrt{\gamma} \qquad \text{(Equation 10)}$$

The exemplary embodiment according to the present invention may be used for a mobile communication system, fixed wireless communication, and a wireless local area network (WLAN). For example, in a cell that includes a base station including multiple transmitting antennas and a plurality of users including at least one receiving antenna, when the base station tries to simultaneously transmit different data to the plurality of users using the same spectrum, the interference cancellation method according to the exemplary embodiment of the present invention may be used.

When the base station obtains full CSIT for the selected user group, and the interference cancellation method according to the exemplary embodiment of the present invention is applied, the exemplary embodiment according to the present invention materializes MU-MIMO better than the related art. The MU-MIMO transmits different data streams to the plurality of users by using the same spectrum, which improves the spectrum usage efficiency of the system.

Figure 5:
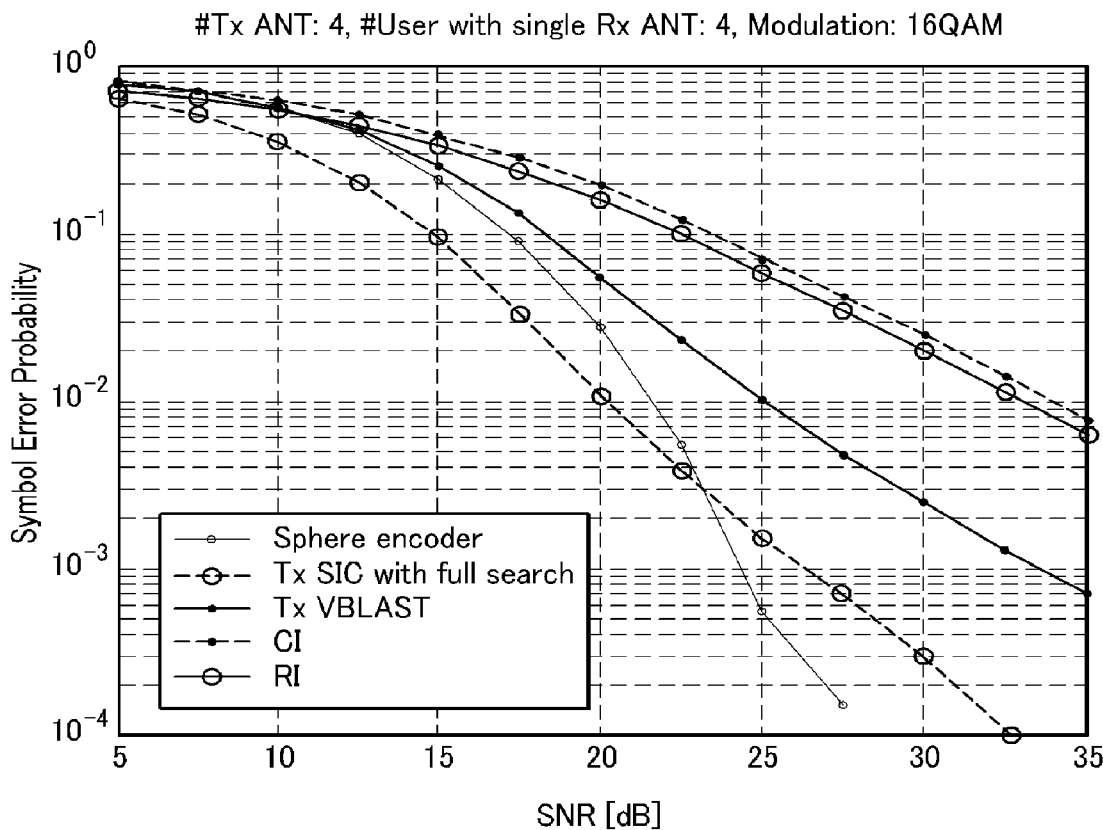
FIG. 5 is a graph comparing the performance of the interference cancellation method according to the exemplary embodiment of the present invention with that of the related art in the case of M=K=4.

FIG. 5 is a graph comparing the performance of the interference cancellation method according to the exemplary embodiment of the present invention with that of the related art in the case of M=K=4. FIG. 5 shows a result of simulation using a 16 QAM modulation method in the case that a transmitter includes four transmitting antennas and four terminals each include one antenna. Referring FIG. 5, the performance of the interference cancellation method according to the exemplary embodiment of the present invention that applies an effective SNR range, that is, under 20 dB, is better than that of a sphere encoder.

Figure 6:
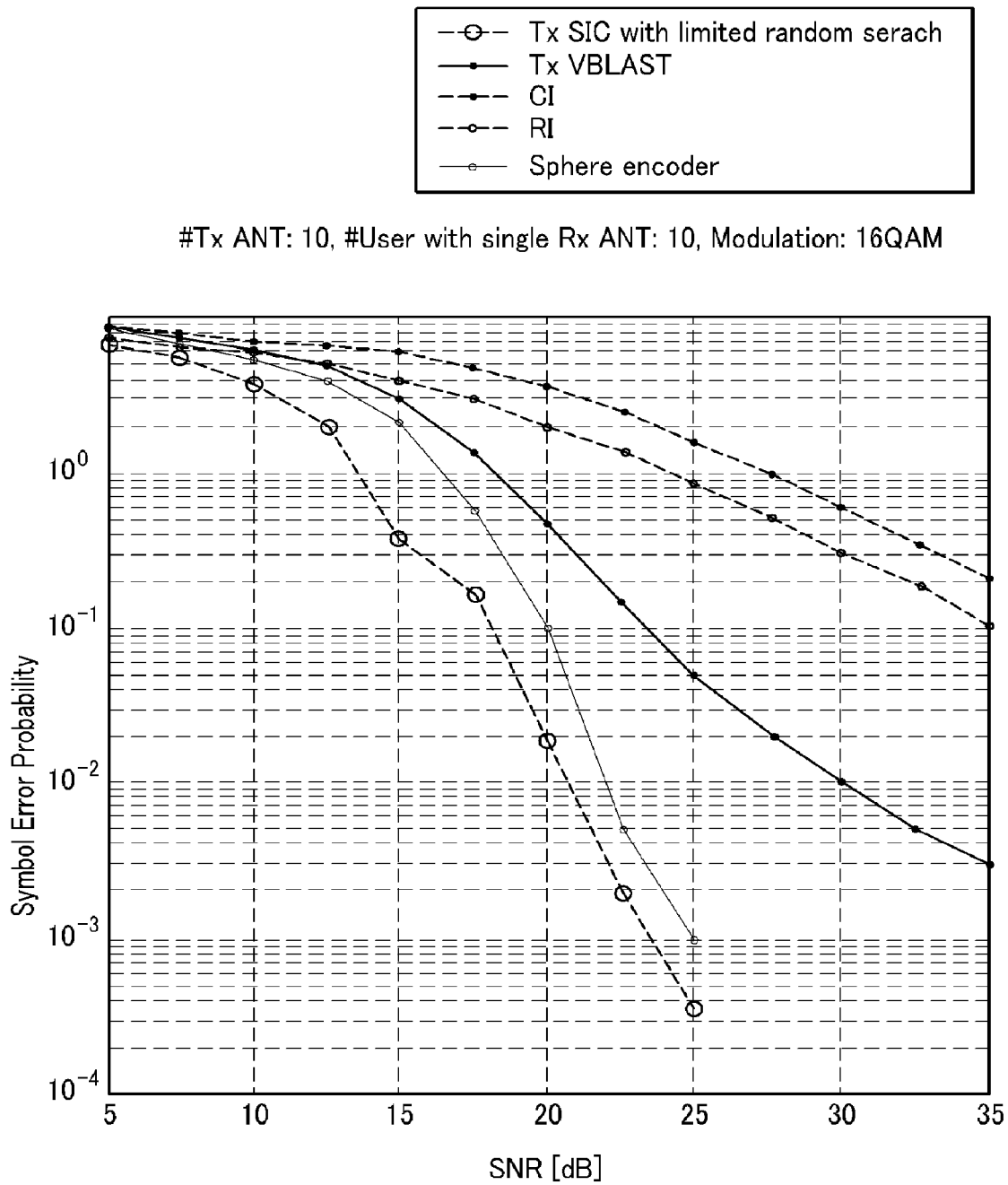
FIG. 6 is a graph comparing the performance of the interference cancellation method according to the exemplary embodiment of the present invention with that of the related art in the case of M=K=10.

FIG. 6 is a graph comparing the performance of the interference cancellation method according to the exemplary embodiment of the present invention with that of the related art in the case of M=K=10. FIG. 6 shows a result of simulation using a 16 QAM modulation method in the case that a transmitter includes ten transmitting antennas and ten terminals each include one antenna. Referring FIG. 6, the performance of the interference cancellation method according to the exemplary embodiment of the present invention in which a limited random search is applied is better than that of a sphere encoder in the entire SNR range.

The exemplary embodiment of the present invention that has been described above may be implemented by not only an apparatus and a method but also a program that is capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method by a transmitter for interference cancellation of the transmitter, the method comprising:
    decomposing a channel matrix to represent formulae of permutation matrixes including a first matrix and a second matrix;
    determining an optimal permutation matrix among a plurality of available permutation matrixes by using a norm of multiplication of the second matrix and a transmitting data vector; and
    determining the second matrix by using the determined optimal permutation matrix and calculating a transmitting precoding vector using the determined second matrix and the transmitting data vector.

2. The method of claim 1, wherein determining the optimal permutation matrix includes:
    calculating a norm of multiplication of the second matrix and the transmitting data vector for each of the plurality of all available permutation matrixes; and
    determining a permutation matrix having the smallest norm of the multiplication of the second matrix and the transmitting data vector as the optimal permutation matrix.

3. The method of claim 2, wherein the norms of multiplication of the second matrix and the transmitting data vector for all available permutation matrixes are calculated when a number of all available matrixes is below a threshold.

4. The method of claim 1, wherein determining the optimal permutation matrix includes:
    arbitrarily selecting some permutation matrixes from the plurality of available permutation matrixes;
    calculating a norm of multiplication of the second matrix and the transmitting data vector for the some permutation matrixes; and
    determining a permutation matrix having the smallest norm of the multiplication of the second matrix and the transmitting data vector as the optimal permutation matrix.

5. The method of claim 4, wherein the norms of multiplication of the second matrix and the transmitting data vector for the arbitrarily selected some permutation matrixes are calculated when a number of all available permutation matrixes is greater than a threshold.

6. The method of claim 1, wherein the representing includes representing the channel matrix as a transpose of the permutation matrix and a product of the first matrix and the inverse matrix of the second matrix.

7. The method of claim 1, wherein calculating the transmitting precoding vector includes:
    dividing a value found by multiplying the determined second matrix and the transmitting data vector by the norm of a value found by multiplying the determined second matrix and the transmitting data vector.

8. The method of claim 1, wherein each permutation matrix is a matrix that rearranges the order of multiple-user-multiple-input-multiple-output (MU-MIMO) terminals.

9. The method of claim 1, wherein the transmitter transmits different data streams to individual terminals by using one spectrum.

10. The method of claim 1, wherein the optimal permutation matrix maximizes a signal-to-noise ratio (SNR).

11. A method by a transmitter for determining an optimal permutation matrix of the transmitter, the method comprising:
    setting an index of a permutation matrix to 1;
    calculating a norm of multiplication of a second matrix determined according to a permutation matrix having an index of 1 and a transmitting data vector;
    confirming whether the index of the permutation matrix is equal to the number of available permutation matrixes;
    increasing the index of the permutation matrix by 1 when the index of the permutation matrix is not equal to the number of available permutation matrixes according to the confirmation result; and
    calculating a norm of the multiplication of the second matrix that is determined by the permutation matrix corresponding to the index of the permutation matrix that is increased by 1 and the transmitting data vector,
    wherein the permutation matrix is a matrix that rearranges the order of terminals having real number elements.

12. The method of claim 11, further comprising:
    repeating the confirming, the increasing, and the calculating steps until the index of the permutation matrix is equal to the number of available permutation matrixes according to the confirmation result; and determining a permutation matrix having the smallest norm of the multiplication of the second matrix and the transmitting data vector as the optimal permutation matrix.

13. The method of claim 12, wherein the permutation matrix having the smallest norm of the multiplication of the second matrix and the transmitting data vector is determined from the set of norms of the multiplication of the second matrix and the transmitting data vector calculated from all the available permutation matrixes.

14. The method of claim 11, wherein each permutation matrix is a matrix that rearranges orders of multiple-user-multiple-input-multiple-output (MU-MIMO) terminals.

15. The method of claim 14, wherein the optimal permutation matrix comprises the orders of MU-MIMO terminals minimize transmitting power.

16. The method of claim 11, wherein the optimal permutation matrix maximizes a signal-to-noise ratio (SNR).

17. A method by a transmitter for determining an optimal permutation matrix of the transmitter, the method comprising:
    selecting a plurality of second permutation matrixes from a plurality of first permutation matrixes;
    setting an index of the permutation matrixes to 1;
    calculating a norm of multiplication of a transmitting data vector and the second matrix that is determined by a permutation matrix whose index is 1 among the plurality of second permutation matrixes;
    confirming whether the index of the permutation matrix is equal to the number of the plurality of second permutation matrixes;
    increasing the index of the permutation matrix by 1 when the index of the permutation matrix is not equal to the number of the plurality of second permutation matrixes according to the confirmation result; and
    calculating a norm of the multiplication of the second matrix that is determined by the permutation matrix corresponding to the index of the permutation matrix that is increased by 1 and the transmitting data vector,
    wherein the permutation matrix is a matrix that rearranges the order of terminals having real number elements.

18. The method of claim 17, further comprising:
    repeating the confirming, the increasing, and the calculating steps until the index of the permutation matrix is equal to the number of the plurality of second permutation matrixes according to the confirmation result; and
    determining a permutation matrix having the smallest norm of the multiplication of the second matrix and the transmitting data vector among the plurality of second permutation matrixes as the optimal permutation matrix.

19. The method of claim 17, wherein selecting the plurality of second permutation matrixes includes:
    arbitrarily selecting the second plurality of second permutation matrixes from the first plurality of permutation matrixes when the number of the first plurality of permutation matrixes is greater than a threshold, and wherein the first plurality of permutation matrixes includes all available permutation matrixes.

20. The method of claim 17, the optimal permutation matrix maximizes a signal-to-noise ratio (SNR).

* * * * *